United States Patent
Corl, Jr. et al.

(10) Patent No.: US 7,454,396 B2
(45) Date of Patent: Nov. 18, 2008

(54) METHOD FOR COMPRESSING MULTI-FIELD RULE SPECIFICATIONS

(75) Inventors: Everett A. Corl, Jr., Raleigh, NC (US);
Gordon T. Davis, Chapel Hill, NC (US);
Marco Heddes, Shelton, CT (US);
Piyush C. Patel, Cary, NC (US);
Ravinder K. Sabhikhi, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 10/832,957

(22) Filed: Apr. 27, 2004

(65) Prior Publication Data

US 2005/0237938 A1    Oct. 27, 2005

(51) Int. Cl.
*G06F 17/00* (2006.01)
*G06N 5/02* (2006.01)

(52) U.S. Cl. ............... 706/47; 706/14; 706/46
(58) Field of Classification Search ......... 706/47, 706/14, 46; 707/102
See application file for complete search history.

(56) References Cited

U.S. PATENT DOCUMENTS

| | | | |
|---|---|---|---|
| 4,868,570 A | 9/1989 | Davis ................. 341/106 |
| 5,373,290 A | 12/1994 | Lempel et al. ......... 341/51 |
| 5,374,928 A | 12/1994 | Moore et al. .......... 341/67 |
| 5,469,161 A | 11/1995 | Bezek ................. 341/51 |
| 5,485,550 A | 1/1996 | Dalton ................ 395/51 |
| 5,546,575 A | 8/1996 | Potter et al. .......... 395/600 |
| 5,680,619 A * | 10/1997 | Gudmundson et al. .... 717/108 |
| 5,805,796 A * | 9/1998 | Finch et al. .......... 714/40 |
| 6,070,166 A | 5/2000 | Whittaker et al. ...... 707/101 |
| 6,192,051 B1 | 2/2001 | Lipman et al. |
| 6,298,340 B1 | 10/2001 | Calvignac et al. ...... 707/3 |
| 6,389,386 B1 | 5/2002 | Hetherington et al. ... 704/8 |
| 6,473,763 B1 | 10/2002 | Corl et al. |
| 6,529,897 B1 | 3/2003 | Corl et al. |
| 6,633,883 B2 * | 10/2003 | Koskas ................ 707/101 |
| 6,675,163 B1 | 1/2004 | Bass et al. |
| 6,886,073 B2 * | 4/2005 | Davis et al. .......... 711/108 |
| 7,039,641 B2 | 5/2006 | Woo |
| 7,043,467 B1 | 5/2006 | Milito et al. |

(Continued)

OTHER PUBLICATIONS

Sunita Sarawagi et al, Integrating Association Rule Mining with Relational Database Systems: Alternatives and Implications, 1998, ACM, 0-89791-995-5/98, 343-354.*

(Continued)

*Primary Examiner*—Joseph P. Hirl
(74) *Attorney, Agent, or Firm*—Sawyer Law Group LLP

(57) ABSTRACT

The present invention relates to a method for storing a plurality of multi-field classification rules in a computer system. Each multi-field classification rule includes a rule specification that itself includes a plurality of fields and a plurality of field definitions corresponding to the fields. The method of the present invention includes providing a virtual rule table, where the table stores a plurality of field definitions, and for each of the plurality of multi-field classification rules, compressing the rule specification by replacing at least one field definition with an associated index into the virtual rule table. The method also includes storing each of the compressed rule specifications and the virtual rule table in a shared segment of memory.

11 Claims, 9 Drawing Sheets

U.S. PATENT DOCUMENTS

| | | | |
|---|---|---|---|
| 2001/0014890 A1* | 8/2001 | Liu et al. | 707/102 |
| 2002/0178335 A1* | 11/2002 | Selkirk et al. | 711/162 |
| 2002/0191605 A1* | 12/2002 | Lunteren et al. | 370/389 |
| 2003/0005248 A1* | 1/2003 | Selkirk et al. | 711/165 |
| 2003/0123459 A1* | 7/2003 | Liao | 370/401 |
| 2003/0233516 A1* | 12/2003 | Davis et al. | 711/108 |

OTHER PUBLICATIONS

IEEE, The Authoritative Dicitonary of IEEE Standard & Terms, 2000, IEEE, 7th.*

Ternary Read-Only Memory, IBM Technical Disclosure Bulletin, vol. 14, No. 4, Sep. 1971, pp. 1337-1338.

Lunteren, J. Van et al., "Multi-Field Packet Classification Using Ternary CAM," Electronics Letters, Jan. 3, 2002, vol. 38, No. 1, pp. 21-23.

"Termary CAM with Range Match Capabilities," Research Disclosure, Apr. 2001, p. 651.

"Hybrid Direct Table and LPM Searches," Research Disclosure, Mar. 2001, p. 456.

* cited by examiner

Filter Rule (1 byte)

600a

Filter & Redirect Rule (7 bytes)

600b

Filter & Diffserv Rule (7 bytes)

600c

Filter, Redirect & Diffserv Rule (13 bytes)

600d

Current Leaf Structure

Compressed Leaf Structure

METHOD FOR COMPRESSING MULTI-FIELD RULE SPECIFICATIONS

FIELD OF THE INVENTION

The present invention relates to computer systems, and more particularly to a method and system for compressing multi-field rule specifications of rules used in classification.

BACKGROUND OF THE INVENTION

FIG. 1 depicts conventional networks 10 and 20 which may be connected to the Internet 30. Each network 10 and 20 includes host 12, 14 and 16 and 22 and 24, respectively. Each network 10 and 20 also includes a switch 18 and 26, respectively, and may include one or more servers such as the servers 17, 19 and 28, respectively. In addition, each network 10 and 20 may include one or more gateways 13 and 25, respectively, to the Internet 30. Not explicitly shown are routers and other portions of the networks 10 and 20 which may also control traffic through the networks 10 and 20 and which will be considered to be inherently depicted by the switches 18 and 26, respectively, and the networks 10 and 20 in general.

FIG. 2 depicts a portion of a typical switch 50, which may be used for the switches 18 and 26 (FIG. 1) and/or a router (not shown). The switch 50 includes a network processor 52 and storage 54. The switch 50 typically also includes other components (not shown). The network processor 52 manages functions of the switch 50, including the classification of packets using the rules described below. The storage 54 retains data relating to the rules.

Referring to FIGS. 1 and 2, in order to manage communications in a network, such as the network 10 or 20, filter rules are used. Filter rules are typically employed by switches, routers and other portions of the network to perform packet classification. Each filter rule is used to classify packets which are being transmitted via a network in order to determine how the packet should be treated and what services should be performed. For example, a filter rule may be used in testing packets entering the network from an outside source to ensure that attempts to break into the network can be thwarted. For example, traffic from the Internet 30 entering the network 10 may be tested in order to ensure that packets from unauthorized sources are denied entrance.

Similarly, packets from one portion of a network may be prevented from accessing another portion of the network. For example, a packet from some of the hosts 12, 14 or 16 may be prevented access to either the server 17 or the server 19. The fact that the host attempted to contact the server may also be recorded so that appropriate action can be taken by the owner of the network.

Such filter rules may also be used to transmit traffic based on the priorities of packets. For example, packets from a particular host, such as the host 12, may be transmitted because the packets have higher priority even when packets from the hosts 14 or 16 may be dropped. The filter rules may also be used to ensure that new sessions are not permitted to be started when congestion is high even though traffic from established sessions is transmitted. Other functions could be achieved based on the filter rule as is well known to those skilled in the art.

In order to determine whether a particular rule will operate on a particular packet, a key is tested. The key typically includes selected fields, known collectively as the TCP/IP 5-tuple or just the 5-tuple, extracted from the Internet Protocol (IP) and TCP headers of the packet. The IP and TCP headers typically contain five fields of interest: the source address (SA), the destination address (DA), the source port (SP), the destination port (DP) and the protocol. These fields are typically thirty-two bits, thirty-two bits, sixteen bits, sixteen bits and eight bits, respectively. Rules typically operate on one or more of these fields. For example, based on the source and/or destination addresses, the rule may determine whether a packet from a particular host is allowed to reach a particular destination address. In addition to the fields of the TCP/IP 5-tuple, those skilled in the art appreciate that the key can include additional fields that determine how traffic is managed through the network for example. Thus, the filter rules typically operate using a key that includes at least some fields of the IP header of a packet and may include additional bits.

In testing a key against a filter rule, it is determined whether the filter rule should be enforced against the packet associated with the key. The key is tested by comparing specified fields for the key of the packet with a range(s) of values defined by the filter rule. Each rule contains a range of values in one or more dimensions. Each dimension corresponds to a field of the key (typically the IP header). One type of filter rule has a range consisting of a single value or a spread of values. In such a case, a "Range-rule" search is performed to determine whether the key exactly matches the value for the rule. Other rules have ranges which can be expressed using a single prefix. The prefix is a binary number containing a number of ones and zeroes (1 or 0), followed by place holders, or wildcards (*). In this case, a "Wildcard-match" is performed to determine whether the rule applies to the packet.

Testing the key against a filter rule can be a tedious and time consuming procedure, which is multiplied several times over when the number of filter rules increases. In order to expedite this process, a search facility known as a "Software-managed tree" (SMT) search engine is utilized. Generally, the SMT search engine analyzes a collection of filter rules, and based on the rules' conditions, builds a plurality of tree structures. Each tree structure includes a series of hierarchical nodes and leaves. At each node, a specified field(s) of the key is tested, and depending on the outcome of the test, a path is followed, which terminates at a leaf. Each leaf includes a filter rule that includes the rule specification and defines an action to be taken with regard to a packet. Under certain circumstances, the key will fit two or more rules. In this case, the rules-intersect and the key is then tested in a lattice of tests using compares and full rule tests. The SMT search engine is described in more detail in U.S. Pat. No. 6,298,340, entitled, "SYSTEM AND METHOD AND COMPUTER PROGRAM FROM FILTERING USING TREE STRUCTURE" issued on Oct. 2, 2001, and assigned to the assignee of the present invention.

The SMT search engine enables a search on multiple fields within the key, and within each field, looks for either a pattern under a mask (Wildcard match), or a range specified by a minimum or a maximum (Range-rule), as the criteria for declaring a match. The search engine can utilize standard memory structures resulting in an economical implementation. Nevertheless, utilizing such memory structures presents issues. For example, characteristics of the tree structures contribute to excessive latency in completing the searches and contribute to an inefficient use of storage space. Thus, utilizing standard memory structures, while economical, makes it very difficult to support multi-field classification in an SMT engine.

Current solutions to this issue include utilizing a ternary content addressable memory (TCAM). TCAMs include logic, such as a comparator, for each location. The logic allows the entries of the TCAM to be searched in parallel. Nevertheless, although TCAMs provide high-performance multi-field classification, they also add significant costs to a system.

Accordingly, what is needed is a system and method for providing high-performance multi-field classification utilizing standard memory structures. The system and method should implement an improved search facility that maintains the cost advantage of using standard memory structures, while improving performance to approach that of a more expensive TCAM solution. The present invention addresses such a need.

SUMMARY OF THE INVENTION

The present invention relates to a method and system for storing a plurality of multi-field classification rules in a computer system. Each multi-field classification rule includes a rule specification that itself includes a plurality of fields and a plurality of field definitions corresponding to the fields. The method of the present invention includes providing a virtual rule table, where the table stores a plurality of field definitions, and for each of the plurality of multi-field classification rules, compressing the rule specification by replacing at least one field definition with an associated index into the virtual rule table. The method also includes storing each of the compressed rule specifications and the virtual rule table in a shared segment of memory.

Through aspects of the method and system of the present invention, a variable length rule definition format is provided that requires field definitions only for relevant fields.

Moreover, the field definitions for the relevant fields are extracted from the rule specification and replaced by an index into the virtual rule table, which stores the field definitions corresponding to the relevant fields. By compressing the rule specifications in this manner, a plurality of classification rules can be packed into a single DRAM entry, thus enabling a chain of rules to be accessed via single DRAM read operation. Accordingly, with the method and system of the present invention, performance levels utilizing standard memory structures approach those in systems utilizing a TCAM.

DETAILED DESCRIPTION OF THE INVENTION

The present invention relates to computer systems, and more particularly to a method and system for compressing multi-field rule specifications of rules used in classification. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. For example, although the present invention will be described in the context of filter rules, one of ordinary skill in the art will readily recognize that the method and system can operate effectively for other multi-field classification rules. Likewise, while the present invention is described in the context of a DRAM memory subsystem, one of ordinary skill in the art will readily recognize that the method and system can operate effectively for other types of memory subsystems (eg. SRAM). Thus, the present invention is not intended to be limited to the embodiment shown, but is to be accorded the widest scope consistent with the principles and features described herein.

Figure 1:
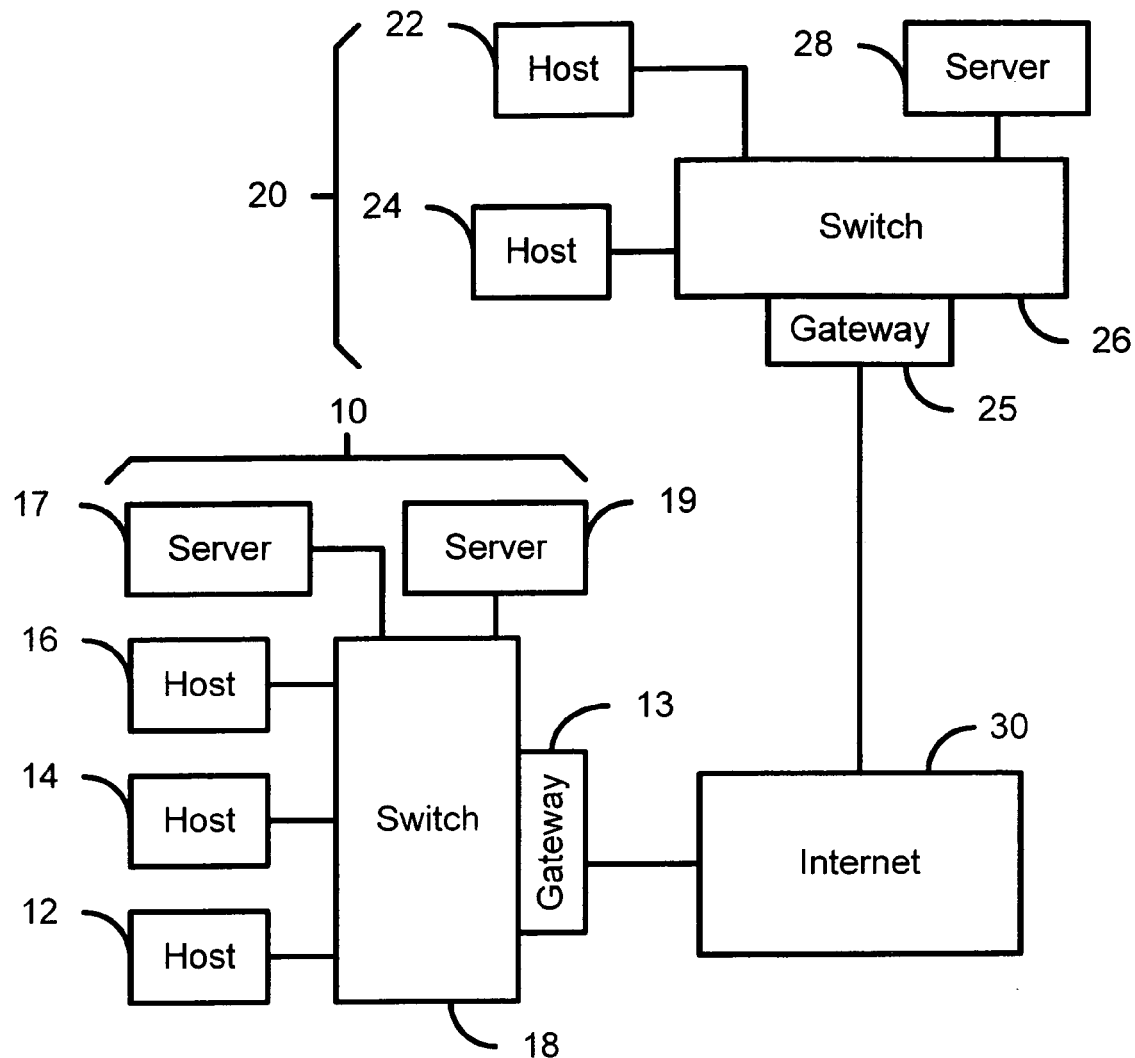
FIG. 1 is a diagram of computer systems of networks in which the present invention can be used.
Figure 2:
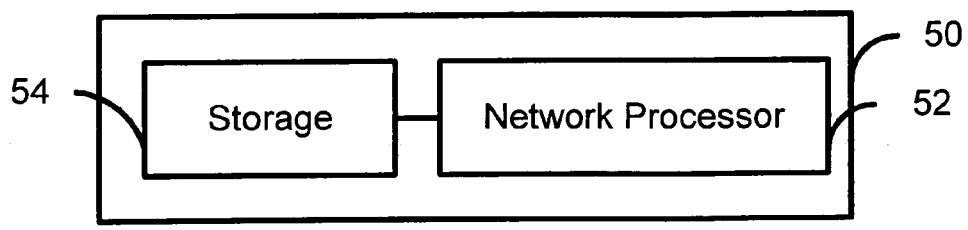
FIG. 2 is a diagram of a switch in which the present invention can be used.
Figure 3:
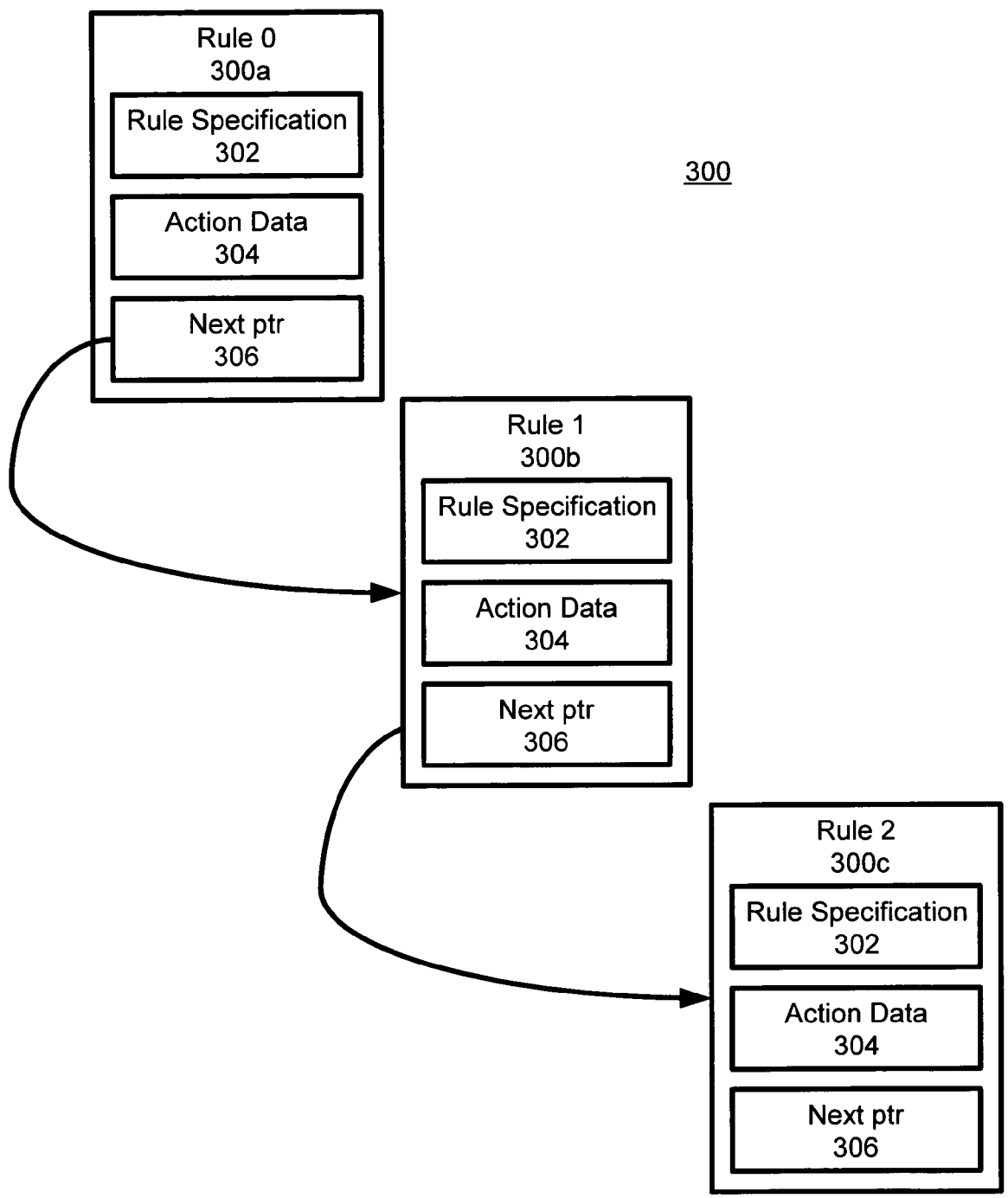
FIG. 3 is a block diagram of a leaf chain of intersecting rules.

FIG. 3 is a block diagram of a leaf chain 300 of intersecting rules. As is shown, three rules 300a-300c form the leaf chain 300, where each rule 300a-300c is stored in a leaf. Each rule, e.g., 300a, includes a rule specification 302, action data 304 and a pointer 306 to the next rule 300b in the next leaf in the leaf chain 300. Typically, each leaf is a single DRAM entry of a maximum of 64 bytes. The rule specification 302 includes a pattern and mask (e.g., for IP Addresses) and/or minimum and maximum values for TCP port numbers, and other fields such as protocol, TOS, and TCP Flags. Typically, the rule specification 302 consumes 32 bytes, of which the bulk are dedicated to defining the pattern and mask and/or minimum and maximum values.

The action data 304 defines what action type(s) is associated with the rule 300a. Generally, three action types are defined: (1) Filter; (2) Redirect; (3) DiffServ. The Filter action type either forwards the packet to the destination address or drops the packet. The Redirect action type directs the packet to be sent to a different destination address. The DiffServ action type enforces a Quality of Service (QoS) condition. The action data 304 can include any one or a combination of action types, and typically consumes 16 bytes regardless of the number of action types specified. Finally, the pointer 306 points to the next rule 300b in a leaf in the leaf chain 300.

As stated above, the leaf chain 300 represents intersecting rules 300a-300c. During the search process, the key is compared to each of the rules 300a-300c in the leaf chain 300 in sequence until a match is found. This process contributes to excessive latency because it typically requires several DRAM accesses (one for each rule 300a-300c in the case where rule 300c is the desired match), and also inefficiently utilizes memory (one 64 byte rule per DRAM entry).

According to a preferred embodiment of the present invention, a method and system is provided for compressing multi-field classification rules and their corresponding action data so that a plurality of rules can be stored in a single leaf. A variable length rule definition format is described that only requires field definitions for selected fields of a multi-field classification rule. The selected field definitions are stored in at least one value table in each leaf, which is referenced via an index in the compressed rule. By storing field definitions in the value tables, a 32 byte multi-field rule specification can be compressed into seven (7) or fewer bytes, depending on the number of selected fields. In addition, action data associated with a rule is also of variable length depending on an action type. Accordingly, several multi-field classification rules and their corresponding action data can be stored in a single DRAM entry, e.g., 64 byte leaf, thereby enabling a chain of rules to be accessed via a single DRAM read operation.

As stated above, the method and system of the present invention compresses the rule specification 302 and action data 304 associated with a rule 300a in order to store a plurality of rules in a single leaf. According to a preferred embodiment of the present invention, this is accomplished, in part, by defining a compressed rule format to represent the rule specification 302, and action data formats to represent the action data 304. Each format will be described below.

Compressed Rule Format

Figure 4:
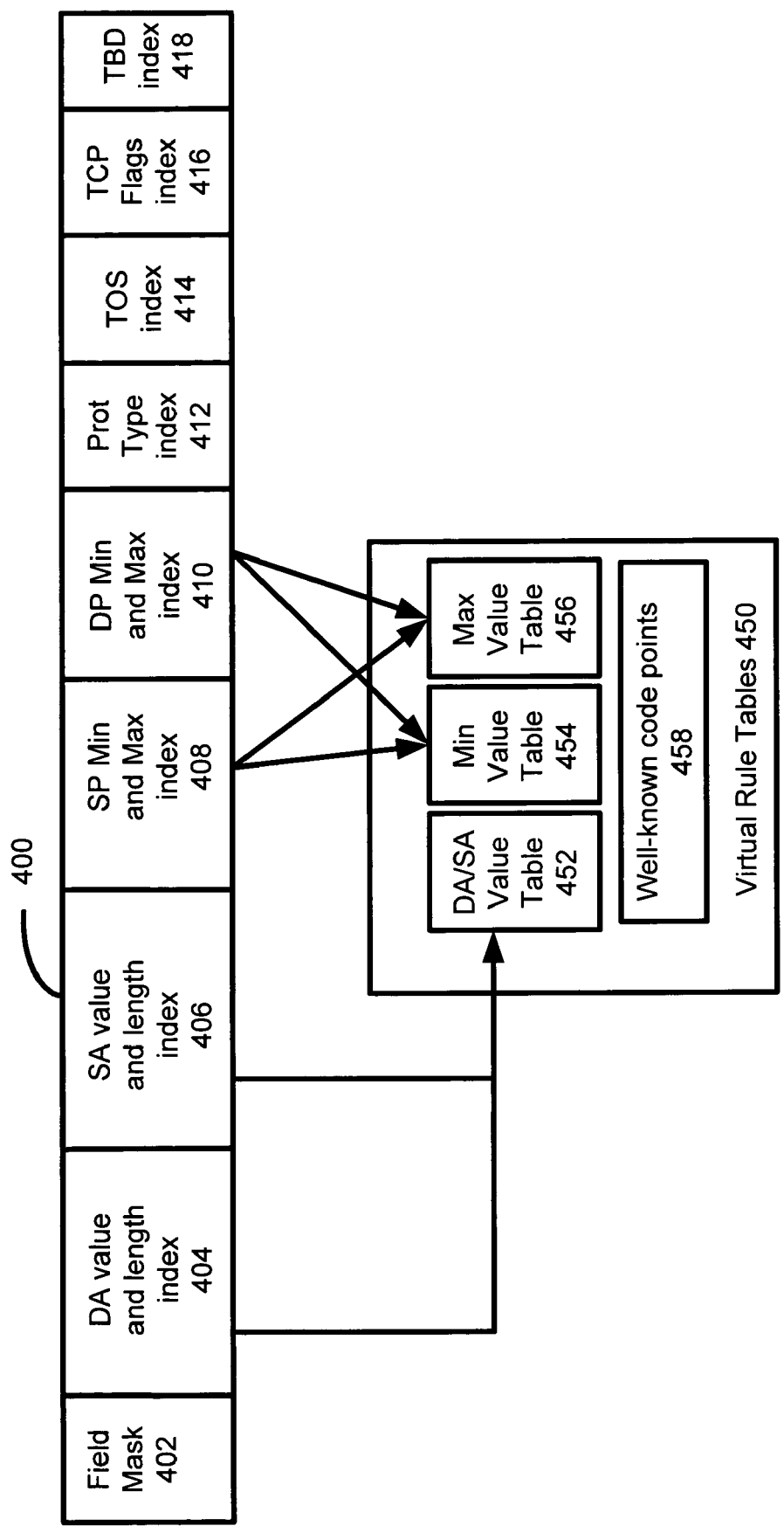
FIG. 4 is a block diagram of a compressed rule format according to a preferred embodiment of the present invention.

FIG. 4 is a block diagram of a compressed rule format 400 according to a preferred embodiment of the present invention. The compressed rule format 400 is a variable length rule definition format that only requires field definitions for relevant fields. The compressed rule format 400 includes up to eight (8) fields: (1) a destination address value index and length field 404, (2) a source address value index and length field 406, (3) source port minimum and maximum value index field 408, (4) destination port minimum and maximum value index field 410, (5) protocol type index field 412, (6) type of service (TOS) index field 414, (7) TCP Flags index field 416 and (8) an index for a field to be determined (TBD) 418. These eight fields 404-418 correspond to those in a rule specification, e.g., 302 (FIG. 3). Those skilled in the art appreciate that alternative fields can be defined so long as the corresponding rule specification is consistent with the sequence of fields within the key and match the field types defined. The rule specification 302 includes definitions for each of the fields 404-418. Nevertheless, not all definitions are necessarily relevant to the rule. For example, a rule can specify an action for a particular destination address regardless of the source destination. Here, the field definition for the destination address value index and length field 404 would be relevant, but the definition for the source address value index and length field 406 would be irrelevant, i.e., "don't care."

According to the preferred embodiment of the present invention, the compressed rule format 400 only requires field definitions for those fields that are relevant to the rule specification 302. Thus, for the rule in the above example, the compressed rule format 400 only provides the field definition for the destination address index and length field 404. If no other fields are relevant, no further definitions are provided. In this manner, the compressed rule format 400 is a variable length rule specification format that minimizes the amount of data needed to represent the rule.

As is shown in FIG. 4, the compressed rule format 400 includes a field mask 402 having eight (8) bits, where each bit corresponds to one of the eight field definitions 404-418. If a field includes a definition that is relevant to the rule, the corresponding bit in the field mask 402 is set to one (1). Otherwise, if the definition in a field is not relevant, e.g. "don't care," the corresponding bit is set to zero (0). Thus, the field mask 402 supports a variable length rule definition by indicating which field definition(s) are relevant to the rule 300a.

Moreover, according to the preferred embodiment of the present invention, the field definition of the relevant field is stored in virtual rule tables 450, instead of in the corresponding field in the compressed rule format 400. As is shown, the virtual rule tables 450 include value tables for destination and source addresses 452, and minimum 454 and maximum 456 range values. Although shown as three separate tables, these value tables 452-456 can be collapsed into one table or expanded into more than three tables. In addition to the value tables 452-456, the virtual rule tables 450 also include well-known code points 458. In the preferred embodiment, commonly used or well-known values are hard-coded, i.e., not programmable, or soft-coded, or a combination of both, into a central configuration resource. These values are not stored in any of the value tables 452-456 and therefore, do not consume valuable space therein. 15 In the preferred embodiment, the size of the value tables 452-456 can vary, allowing a trade-off between rule complexity, number of rules, and number of unique values. The size may be specified explicitly or aligned with the end of the data structure enabling an implicit specification based on the indices used in the rule definitions.

In the preferred embodiment, the rule specification 302 is compressed by replacing the relevant field definitions with indices into the appropriate value table 452-456 or code point, where the full field definitions are stored. This provides several advantages. First, a single field definition, e.g., the destination address 404, can be reused in several rules in a leaf chain, i.e., the definition covers multiple rules. By storing the definition in the value table, it is stored once and can be referenced repeatedly by several rules in a chain. Secondly, the indices are significantly smaller than the corresponding field definitions, which allows for a compressed representation of selected field specifications in the compressed rule format 400. For example, an IP address, e.g., destination address, is typically treated as a prefix (32 bits) and a length (32 bits). Thus, the field definition for an IP address is ordinarily 64 bits. In the preferred embodiment of the present invention, the index representing the IP address value, e.g., 404, is three (3) bits and the length can be coded directly in five (5) bits. Thus, the IP address is represented in the compressed rule format 400 by eight (8) bits, as opposed to 64 bits.

In a preferred embodiment, the compressed rule format 400 represents IP addresses (destination and source) by 3-bit indices into the value table 452 and 5-bit length descriptions, minimum and maximum port numbers by 4-bit indices into the respective value tables 454, 456, and Protocol type, TOS, TCP Flags and the TBD fields by 4-bit indices into one of either minimum 454 or maximum 456 value table. Accordingly, the maximum length of a rule defined by the compressed rule format 400 is 56 bits (7-bytes), although because the compressed rule format 400 provides field definitions only for relevant fields, the length is typically smaller. This length is significantly smaller than the uncompressed rule length of 256 bits (32 bytes).

Figure 5:
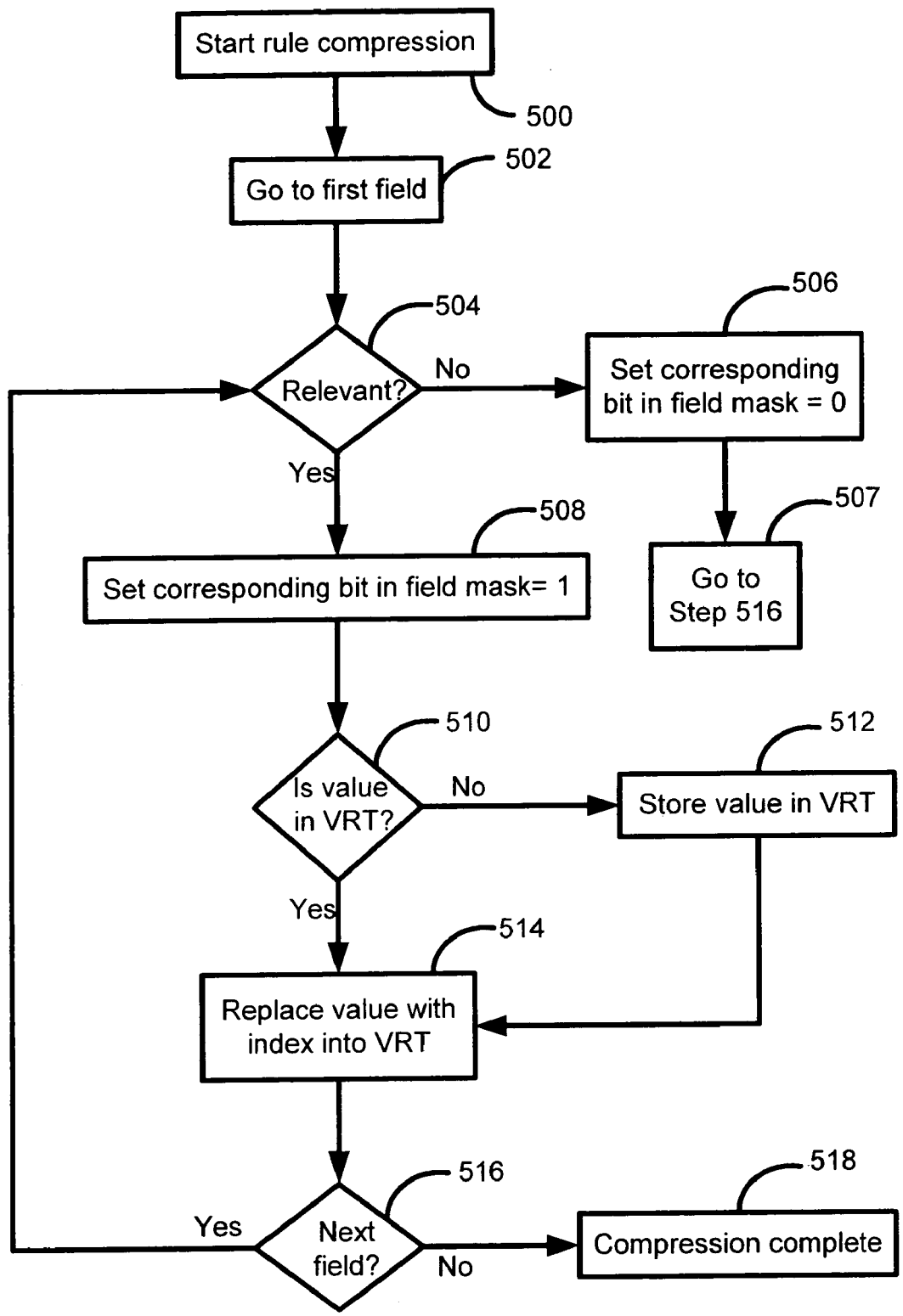
FIG. 5 is a flowchart illustrating one embodiment of a method for compressing a rule specification according to a preferred embodiment of the present invention.

FIG. 5 is a flowchart illustrating a method for compressing a rule specification 302 according to a preferred embodiment of the present invention. The compression begins at step 500 and proceeds to step 502 where the first field 404 in the rule specification 302 is examined. In step 504, it is determined whether the field 404 is relevant, i.e., whether the field definition exists. If the field 404 is not relevant, the bit in the field mask 402 corresponding to the field is set to zero (0) (step 506) and the process proceeds to the next field 406 (step 516) via step 507.

If the field 404 is relevant (step 504), then the bit in the field mask 402 corresponding to the field is set to one (1) in step 508. Next, it is determined whether the field definition value is stored in the virtual rule tables 450, either in the value tables 452-456 or as a well known code point 458 (step 510). If the field definition is not in the virtual rule tables 450, the definition is stored in the appropriate value table 452-456 (step 512), and the field definition is replaced with an index into the virtual rule tables 450 (step 514) that corresponds to the value of the field definition. If the field definition is already in the virtual rule tables 450, the process goes directly to step 514. If another field needs to be checked (step 516), process steps 504 through 514 are repeated. Otherwise, the compression is completed in step 518. The compression process described above is repeated for each rule specification 302 in the chain leaf 300 (FIG. 3).

Action Data Format

As stated above, the action data 304 of a rule 300a indicates how a packet should be handled if its key matches the rule 300a. Three action types are defined: (1) Filter; (2) Redirect; (3) DiffServ. The action data 304 can include any one or a combination of action types, and according to the prior art, the action data 304 consumes 16 bytes regardless of the number of action types specified.

Figure 6A:
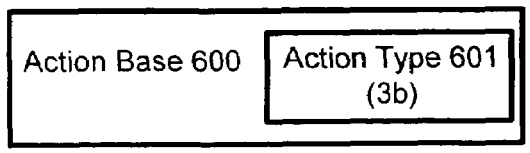
FIGS. 6A-6D are block diagrams depicting action data formats according to a preferred embodiment of the present invention.
Figure 6B:
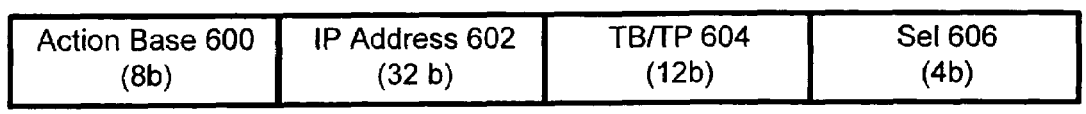
Figure 6C:
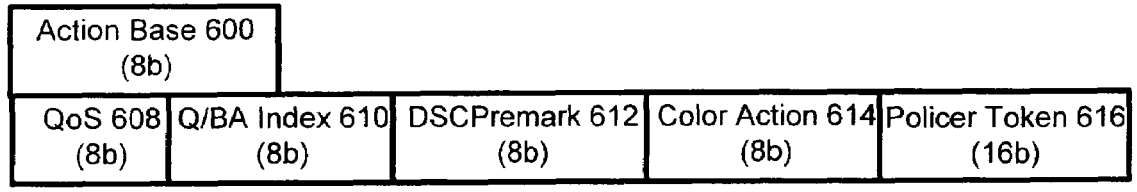
Figure 6D:
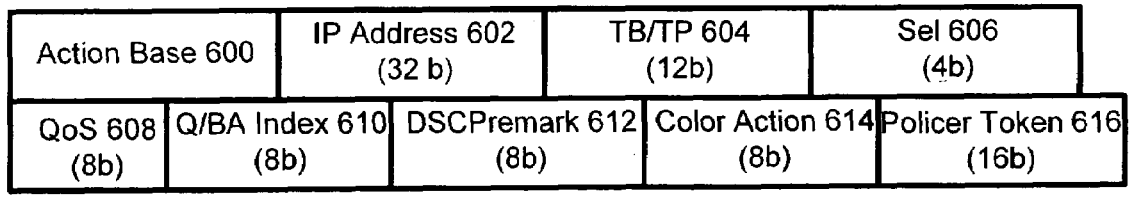

According to the preferred embodiment of the present invention, the action data format is a variable length format based on the action type(s). FIGS. 6A-6D are block diagrams depicting action data formats 600a-600d according to a preferred embodiment of the present invention. FIG. 6A is the action data format 600a for a Filter Rule, FIG. 6B is the action data format 600b for a Filter and Redirect Rule, FIG. 6C is the action data format 600c for a Filter and Diffserv Rule, and FIG. 6D is the action data format 600d for a Filter, Redirect and Diffserv Rule. As is shown, each of the action data formats 600a-600d includes an Action Base 600 defined by the first eight (8) bits. The Action Base 600 includes an action type 601 defined by three (3) bits. Each bit in the action type 601 corresponds to an action type associated with a rule 300a. Thus, by examining the action type bits 601 in the Action Base 600, the action type(s) for the rule 300a can be determined quickly.

Depending on the action type of the rule, the action data formats 600a-600d allow the action data 304 to be represented by as little as one byte (for a Filter Rule 600a) and at most by 13 bytes (Filter, Redirect and Diffserv Rule 600d). Thus, for all simple action types, e.g., Filter, Filter and Redirect, and Filter and Diffserv, the action data 304 is compressed significantly.

Figure 7:
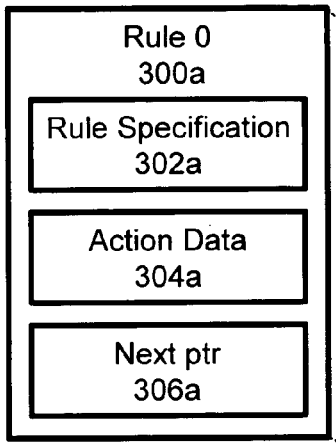
FIG. 7 is a block diagram of a rule block including a plurality of compressed rules according to a preferred embodiment of the present invention.
Figure 7:
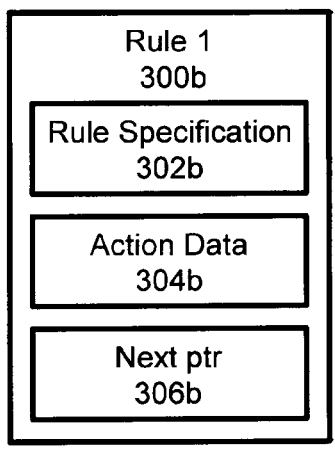
Figure 7:
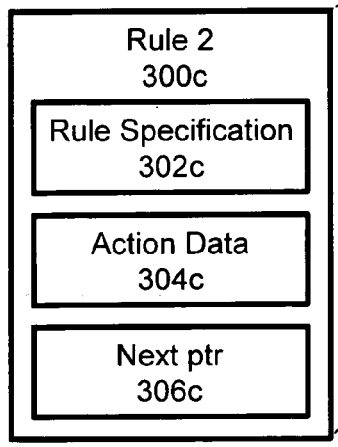
Figure 7:
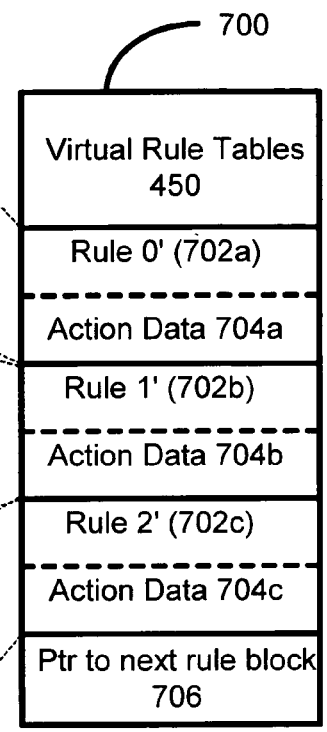

By utilizing the rule compression format 400 and action data formats 600a-600d described above, the rule specification 302 and action data 304 is compressed significantly, thereby allowing a plurality of rules 300a-300c to be packed in a single 64 byte leaf. FIG. 7 is a block diagram of a rule block 700 including a plurality of compressed rules according to a preferred embodiment of the present invention. The rule block 700 preferably is a 64 byte leaf. The compressed rules 702a-702c and compressed action data 704a-704c represent rule specifications 302a-302c and action data 304a-304c of rules 300a-300c once stored in separate leaves. The rule block 700 includes the virtual rule tables 450, which as indicated above, can be of varying size. Thus, if virtual rule tables 450 are small, more space is available for compressed rules 702 and/or action data 704.

According to the preferred embodiment of the present invention, the number of compressed rules 702 that can be stored in a rule block 700 on a 64-byte leaf is based on the number of relevant fields in the corresponding rule specifications 302 and the number and type of actions that must be represented. Most rule sets will result in a density of at least three (3) rules 300a-300c per rule block 700. If additional rule blocks 700 are required to represent the rules in the leaf chain, each rule block 700 includes a pointer 706 that points to a next rule block (not shown) where the next set of compressed rules is stored.

Figure 8:
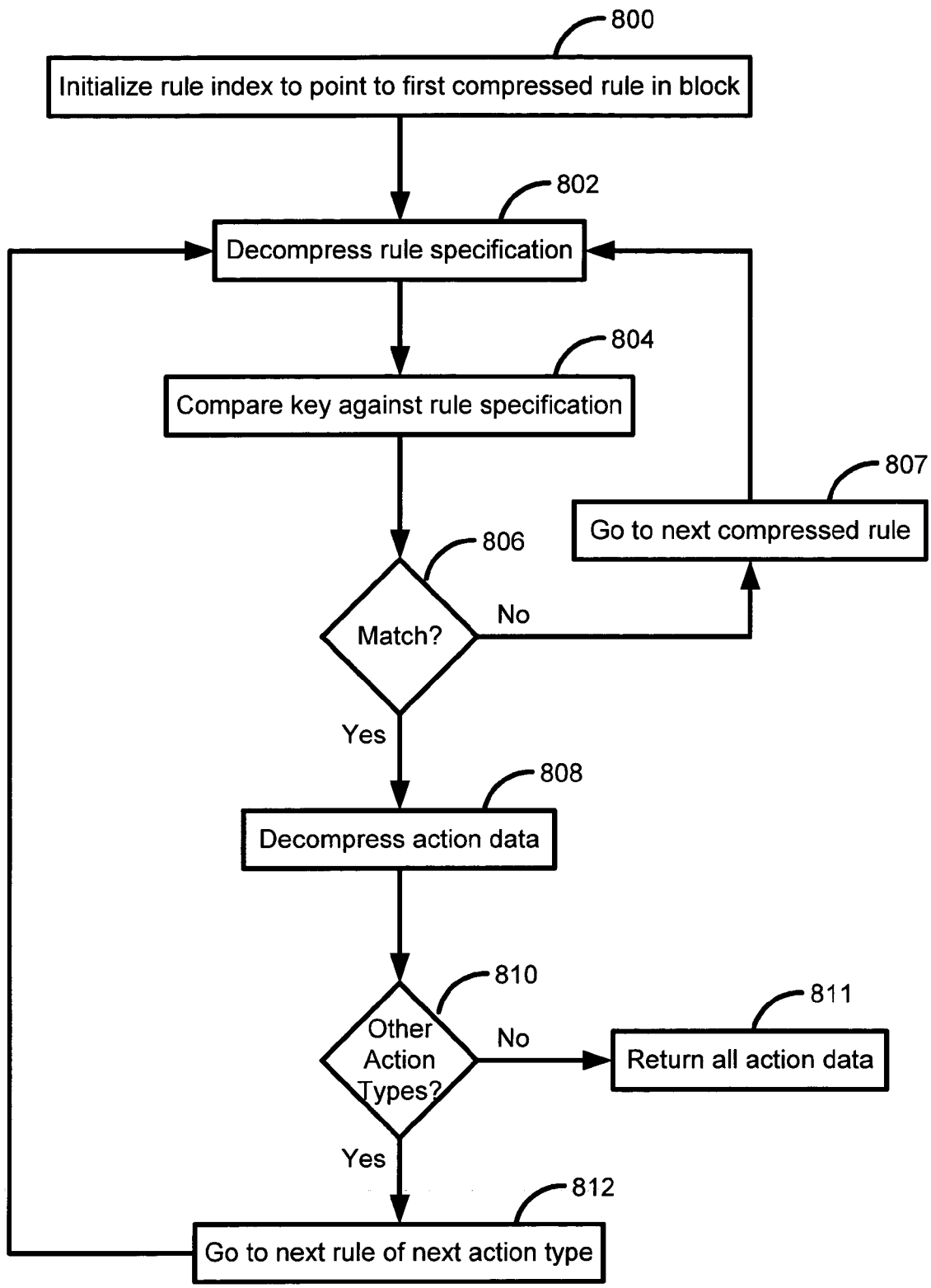
FIG. 8 is a flowchart illustrating a method for utilizing the compressed rule format and action data format during a key search according to a preferred embodiment of the present invention.

FIG. 8 is a flowchart illustrating a method for utilizing the compressed rule format and action data format during a key search according to a preferred embodiment of the present invention. At step 800, a rule index is initialized to point to a first rule 702a (FIG. 7) in the rule block 700. In step 802, the rule specification 702a is retrieved from the rule block 700 and decompressed, i.e., converted into a 32 byte specification 302a. (The decompression process is described in more detail below). Next, the key is compared to the decompressed rule specification 302a in step 804. If the key does not match (step 806), the rule index is advanced to point to the next rule, e.g., 702b, in the rule block 700 (step 807) and steps 802 and 804 are repeated.

If the key does match (step 806), the action data 704a associated with the rule specification 302a is retrieved from the rule block 700 and decompressed in step 808. (The action data decompression process is described in more detail below). Because the rules in a leaf chain are ordered according to their priority, it is necessary to determine whether other rules in the leaf chain indicate different action types (step 810). If other action types are identified, e.g. by comparing the action type bits 601 (FIGS. 6A-6D) of the action data 704a for the first rule 702a with the action type bits 601 of the action data 704b, 704c for the other rules 702b, 702c, then the rule index is advanced to point to the rule, e.g., 702b, corresponding to the next action type (step 812) and steps 802 and 808 are repeated. If no other action types are identified (step 810), then the action data 304 for all matching rules is returned in step 811.

Figure 9:
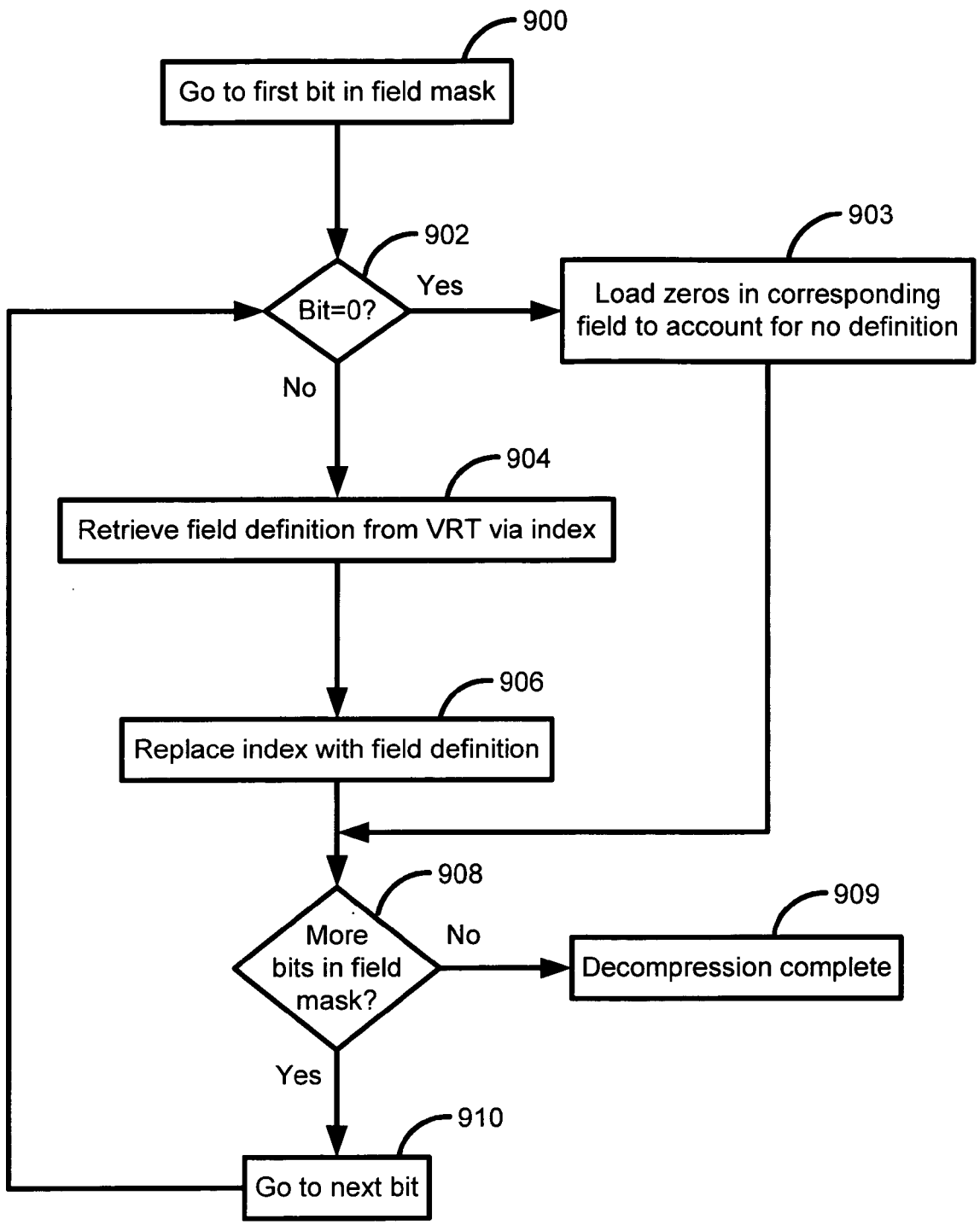
FIG. 9 is a flowchart illustrating a method for decompressing the compressed rule according to a preferred embodiment of the present invention.

FIG. 9 is a flowchart illustrating a method for decompressing the compressed rule according to a preferred embodiment of the present invention. Referring to FIGS. 4 and 9, the decompression process begins by examining the first bit in the field mask 402 of the compressed rule format 400 (step 900). As stated above, the field mask 402 includes eight (8) bits, where each bit corresponds to one of the eight (8) fields 404-418 in the rule specification. The relevance of a field is determined by the value of the corresponding bit. Thus, in step 902, it is determined whether the bit's value is zero (0). If it is zero, then the corresponding field is loaded with zeros to indicate that the field definition is not relevant or "don't care," and the process proceeds to step 908 to check additional bits.

If, however, the bit value is one (1), then the index in the field, e.g., 404, corresponding to the bit is used to retrieve the field definition from the virtual rules tables 450 (e.g., from a value table 452-454 or well-known code point 458) in step 904. The index is replaced by the retrieved field definition in step 906. Note that if the field represents an IP source or destination address, e.g., 404, 406, the address prefix is retrieved from the SA/DA value table 452 via the corresponding 3-bit index, and the length is derived from the corresponding 5-bit description in the field 404, 406. Once the field definition is loaded into the corresponding field, it is determined whether more bits exist in the field mask 402 (step 908). If there are more bits, then steps 902 through 906 are repeated for the next bit (step 910), otherwise, the decompression process is complete (step 909), and the rule specification is returned for further processing (e.g., key matching).

Figure 10:
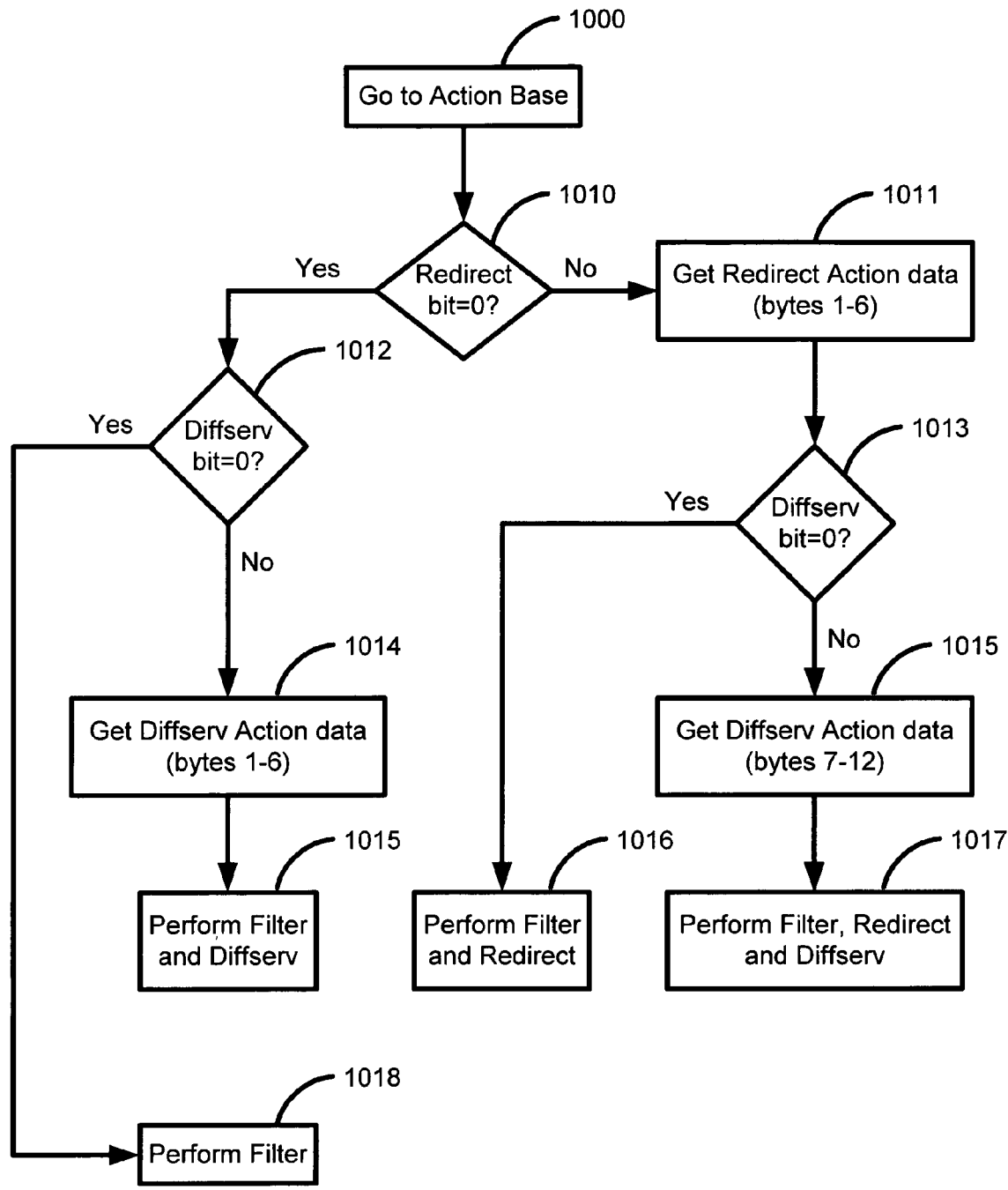
FIG. 10 is a flowchart illustrating a method for decompressing the compressed action data according to a preferred embodiment of the present invention.

FIG. 10 is a flowchart illustrating a method for decompressing the compressed action data according to a preferred embodiment of the present invention. Referring to FIGS. 6A-6D and 9, the decompression process begins at step 1000 by examining the Action Base 600 of the action data format, e.g., 704a, for the rule in question, e.g., 702a. As stated above, the Action Base 600 includes an action type 601 defined by three (3) bits. Each bit in the action type 601 corresponds to an action type associated with the rule 702a. Because all action types include at a minimum a filter, there is no need to examine the bit corresponding to the filter rule during the decompression process. Thus, in step 1010, it is determined whether the bit value corresponding to a Redirect action is zero.

If the Redirect bit is not zero, the action data associated with the Redirect action is retrieved from the action data 704a in bytes 1-6 (step 1011). Next, it is determined whether the bit value corresponding to a Diffserv action is zero (step 1013). If yes, then the action data format defines a Filter and Redirect Rule (see FIG. 6B) in step 1016. If both the Redirect bit and the Diffserv bit are not zero, the action data associated with the Diffserv action is also retrieved from the action data 704*a* in bytes 7-12 (step 1015), and the action data format defines a Filter, Redirect and Diffserv Rule (see FIG. 6D) in step 1017.

Alternatively, if the Redirect bit is zero (step 1010) and the Diffserv bit is zero (step 1012), then the action data format defines a simple Filter Rule (FIG. 6A) in step 1018. If the Redirect bit is zero (1010) and the Diffserv bit is not zero (step 1012), then the action data associated with the Diffserv action is retrieved from the action data 704*a* in bytes 1-6 (step 1014), and the action data format defines a Filter and Diffserv Rule (see FIG. 6C) in step 1015.

A method and system has been disclosed for compressing multi-field rule specifications and their corresponding action data so that a plurality of rules can be packed into a single DRAM entry. By packing multiple rules in such a manner, a chain of rules can be accessed via a single DRAM read operation. Accordingly, the search performance is significantly improved and approaches that of more expensive solutions utilizing TCAMs for example.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for storing a plurality of multi-field classification rules in a computer system, the method comprising:
   providing a virtual rule table;
   compressing a rule specification corresponding to each of the plurality of multi-field classification rules by
      storing in the provided virtual rule table at least one field definition included in the rule specification and
      replacing the at least one field definition included in the rule specification with an index referencing the at least one field definition stored in the virtual rule table;
   storing the compressed rule specifications corresponding to the plurality of multi-field classification rules and the virtual rule table in a single entry of a memory of the computer system; and
   performing a single read operation on the single entry of the memory of the computer system to retrieve the compressed rule specifications corresponding to the plurality of multi-field classification rules.

2. The method of claim 1, wherein compressing the rule specification further comprises:
   for each of a plurality of fields included in the rule specification, determining whether the field is relevant by analyzing a field definition for the field, wherein the field definition is also included in the rule specification.

3. The method of claim 2, wherein the field is relevant if it includes a field definition other than "don't care."

4. The method of claim 2, wherein compressing the rule specification further comprises:
   responsive to the field being relevant, determining whether the field definition for the field is stored in the virtual rule table;
   responsive to the field definition not being stored in the virtual rule table, storing the field definition in the virtual rule table; and
   replacing the field definition included in the rule specification with an index referencing the field definition stored in the virtual rule table.

5. The method of claim 4, wherein compressing the rule specification further comprises:
   responsive to the field definition being stored in the virtual rule table, replacing the field definition included in the rule specification with an index referencing the field definition stored in the virtual rule table.

6. The method of claim 5, wherein compressing the rule specification further comprises:
   responsive to the field not being relevant, skipping to a next field included in the rule specification.

7. The method of claim 2, further comprising:
   appending a field mask to the rule specification corresponding to each of the plurality of multi-field classification rules, the field mask comprising a plurality of bits corresponding to the plurality of fields included in the rule specification; and
   responsive to the field being relevant, setting a value of the bit in the field mask corresponding to the field to one (1).

8. The method of claim 7, further comprising:
   utilizing the field mask appended to the rule specification corresponding to each of the plurality of multi-field classification rules to decompress the rule specification after the rule specification has been compressed.

9. The method of claim 1, further comprising:
   compressing action data corresponding to each of the plurality of multi-field classification rules by
      determining which of a plurality of action types is associated with the action data,
      providing a bit in the action data for each of the plurality of action types, and setting a value of the bit in the action data corresponding to each action type determined to be associated with the action data to one (1); and
   storing the compressed action data corresponding to each of the plurality of multi-field classification rules in the single entry of the memory of the computer system with the compressed rule specification corresponding to each of the plurality of multi-field classification rules and the virtual table.

10. The method of claim 1, wherein the plurality of multi-field classification rules are a plurality of filter rules.

11. The method of claim 1, further comprising:
   decompressing one of the compressed rule specifications retrieved from the single entry of the memory of the computer system;
   comparing a key associated with a packet to the one decompressed rule specification; and
   responsive to the key associated with the packet matching the one decompressed rule specification, filtering the packet in accordance with the multi-field classification rule corresponding to the one decompressed rule specification.

* * * * *